United States Patent [19]
Castracane

[11] Patent Number: 5,999,319
[45] Date of Patent: Dec. 7, 1999

[54] RECONFIGURABLE COMPOUND DIFFRACTION GRATING

[75] Inventor: James Castracane, Albany, N.Y.

[73] Assignee: InterScience, Inc., Troy, N.Y.

[21] Appl. No.: 09/069,502

[22] Filed: Apr. 29, 1998

Related U.S. Application Data

[60] Provisional application No. 60/045,483, May 2, 1997.

[51] Int. Cl.$^6$ ........................................... G02B 5/18
[52] U.S. Cl. ........................... 359/573; 359/572; 359/855
[58] Field of Search .................................... 359/573, 572, 359/291, 295, 855, 224

[56] References Cited

U.S. PATENT DOCUMENTS

| | | | |
|---|---|---|---|
| 4,662,746 | 5/1987 | Hornbeck | 359/223 |
| 4,956,619 | 9/1990 | Hornbeck | 348/771 |
| 5,061,049 | 10/1991 | Hornbeck | 359/224 |
| 5,096,279 | 3/1992 | Hornbeck et al. | 359/230 |
| 5,172,262 | 12/1992 | Hornbeck | 359/223 |
| 5,311,360 | 5/1994 | Bloom et al. | 359/572 |
| 5,459,610 | 10/1995 | Bloom et al. | 359/572 |
| 5,757,536 | 5/1998 | Ricco et al. | 359/224 |
| 5,841,579 | 11/1998 | Bloom et al. | 359/572 |

OTHER PUBLICATIONS

James Castracane and Mikhail Gutin, "MEMS–based microgratings: preliminary results of novel configurations", SPIE vol. 3276, Mar. 1998, pp. 196–206.

Elmers Hung and Stephen D. Senturia, "Leveraged Bending for Full Gap Positioning with Electrostatic Actuation", Solid–State Sensor and Actuator Workshop, Jun. 8–11, 1998, Hilton Head, S.C., pp. 83–86.

C.S. Gudeman, B. Staker, and M. Daneman "Squeeze Film Damping of Doubly Supported Ribbons in Noble Gas Atmospheres", Solid–State Sensor and Actuator Workshop, Jun. 8–11, 1998, Hilton Head, S.C., pp. 288–291.

*Primary Examiner*—Jon Henry
*Attorney, Agent, or Firm*—Jay R. Yablon; Michelle D. Simkulet

[57] ABSTRACT

A reconfigurable compound diffraction grating is fabricated using microelectomechanical systems (MEMS) technology. The compound grating structure can be viewed as the superposition of two separately configured gratings. A common lower electrode is placed beneath selected beam elements, known as deflectable beams, to achieve the desired grating configuration (i.e. every other, every third, every fifth, etc.) of the beams in the primary grating. These deflectable beams alone comprise a secondary, lower resolution grating structure. The beam elements are linked to a common upper electrode. Voltage applied across the electrodes creates an electrostatic force that pulls the selected beams down toward the underlying electrode. Changing the vertical position of the selected beams with respect to the other stationary beams presents a different ruling spacing distribution to the incoming radiation. By changing this distribution, the diffracted power among individual diffraction orders of the wavelengths is altered. Controlling the diffracted signal in this way allows for specific diffraction passbands to be fixed on a particular detector or a particular area of a detector. Automated adjustments to the rulings can be very rapidly, which would significantly simplify and reduce the time necessary for complete spectral analysis previously achieved by mechanical movement of diffraction gratings.

26 Claims, 6 Drawing Sheets

Figure 9

RECONFIGURABLE COMPOUND DIFFRACTION GRATING

CROSS-REFERENCE TO RELATED APPLICATIONS

This application claims the benefit of U.S. Provisional Application No. 60/045,483, filed May 2, 1997.

FIELD OF THE INVENTION

This invention relates to the field of diffraction gratings, and particularly to adjustable and compound diffraction gratings to simplify measurements in multiple spectral passbands.

BACKGROUND OF THE INVENTION

Various designs of micromechanical systems capable of light diffraction have been previously developed for a number of applications. One class of micromechanical diffraction elements, the grating, can be used for various electro-optical applications such as spectroscopy or as spatial light modulators for applications such as display technology and optical signal processing.

A spatial light modulator is presented in U.S. Pat. No. 5,061,049 whereby a reflective element is electrostatically controlled by electrodes to achieve various angles of beam deflection. The primary advantage taught in this patent is the small deflection angle and uniform beam deflection achieved by using two sets of electrodes designated address electrodes and landing electrodes. The landing electrodes minimize the stress to the deflected element. The simple design of the reflective element provides ample means of beam deflection but does not address the diffraction requirements of spectroscopy.

A deformable grating apparatus is presented in U.S. Pat. Nos. 5,459,610 and 5,311,360 both by Bloom et al. The grating apparatus is presented as a means to modulate incident light rays primarily for display technology applications. An array of beams, at initially equal heights and with reflective surfaces, are supported at predetermined fractions of incident wavelength above a similarly reflective base. Below the base is a means of electrostatically controlling the position of the beams by supplying an attractive force which will deflect all of the beams or every other beam to a secondary position. The diffraction of the incident light is dependent upon the position of the reflective beam elements. The primary application of the grating apparatus presented in these prior art patents is as a spatial light valve. Control of the deformable grating apparatus is limited for spectroscopic applications.

OBJECTS OF THE INVENTION

It is an object of the invention disclosed herein to provide a compound diffraction grating developed through microelectromechanical systems (MEMS) processing that can be reconfigured in real time to allow for sequential analysis of multiple passbands thereby simplifying spectroscopic measurements for multispectral analysis.

It is also an object of the invention to provide a reconfigurable compound diffraction grating to enable wavelength tuning in a laser cavity via voltage adjustments to the grating.

SUMMARY OF THE INVENTION

The present invention provides a reconfigurable compound diffraction grating fabricated using MEMS technology. The implementation of this reconfigurable compound diffraction grating in a miniature spectrometer will simplify multispectral analysis measurements.

A common lower electrode is placed beneath selected reflective beam elements to achieve the desired grating configuration (i.e. every other, every third, every fifth, etc.). The same beam elements which have the electrode underneath are elevated above the other beam elements in the grating's initial position. The elevation of periodic selected grating elements is the basis for the design of the compound grating structure, which can be viewed as two gratings superimposed on one another, namely, a lower resolution diffraction grating consisting of only the elevated beams and a higher resolution grating consisting of all of the beams.

All of the beam elements are linked to a common upper electrode. Voltage applied across the upper and lower electrodes creates an electrostatic force that pulls the selected beams down toward the underlying electrode. Changing the vertical position of the selected beams with respect to the other stationary beams presents a different ruling distribution to the incoming radiation. By changing this distribution spacing, the diffracted power among individual diffraction orders of the wavelengths is altered. Controlling the diffracted signal in this way allows for specific diffraction passbands to be fixed on a particular detector or a particular area of a detector.

Therefore a diffraction grating of this design can be sent a series of calibrated voltage pulses to change the ruling distribution of the grating through the desired configurations for complete spectral analysis. These adjustments can be made very rapidly in an automated manner, which significantly simplifies and reduces the time necessary for complete spectral analysis previously achieved by mechanical movement of the diffraction grating, or by interchanging several gratings.

BRIEF DESCRIPTION OF THE DRAWINGS

The features of the invention believed to be novel are set forth in its associated claims. The invention, however, together with further objects and advantages thereof, may best be understood by reference to the following description taken in conjunction with the accompanying drawing(s) in which:

DETAILED DESCRIPTION

The primary basic function of a diffraction grating in any application is to separate incident light by wavelength. The general operation of a diffraction grating is sensitive to the wavelength of incident light and input angle and will diffract specific wavelengths of light at specific angles based on the grating design.

Figure 1:
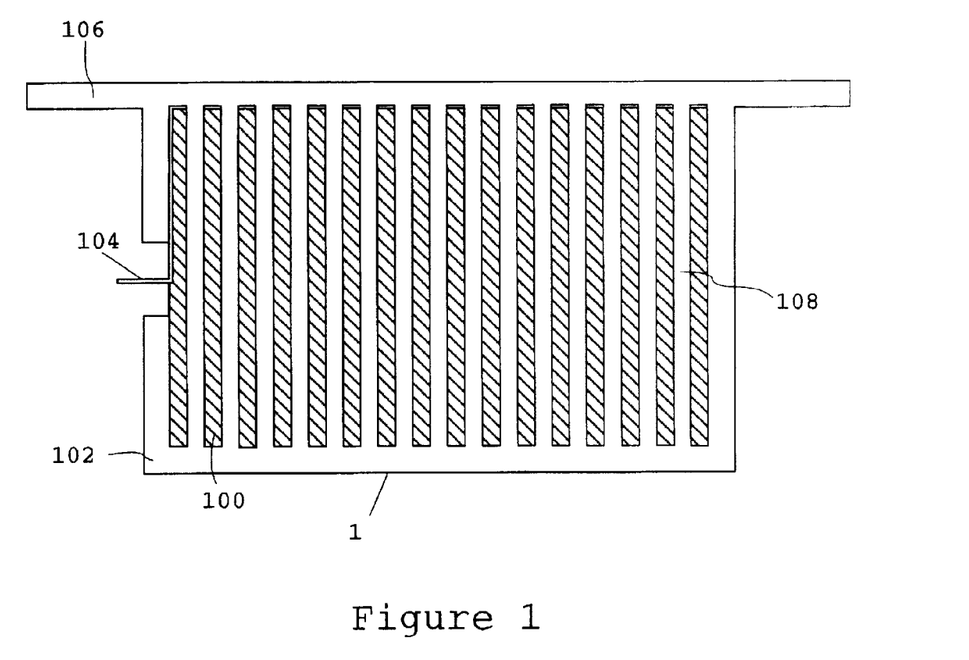
FIG. 1 is a two dimensional top view of the reconfigurable compound diffraction grating.
Figure 3:
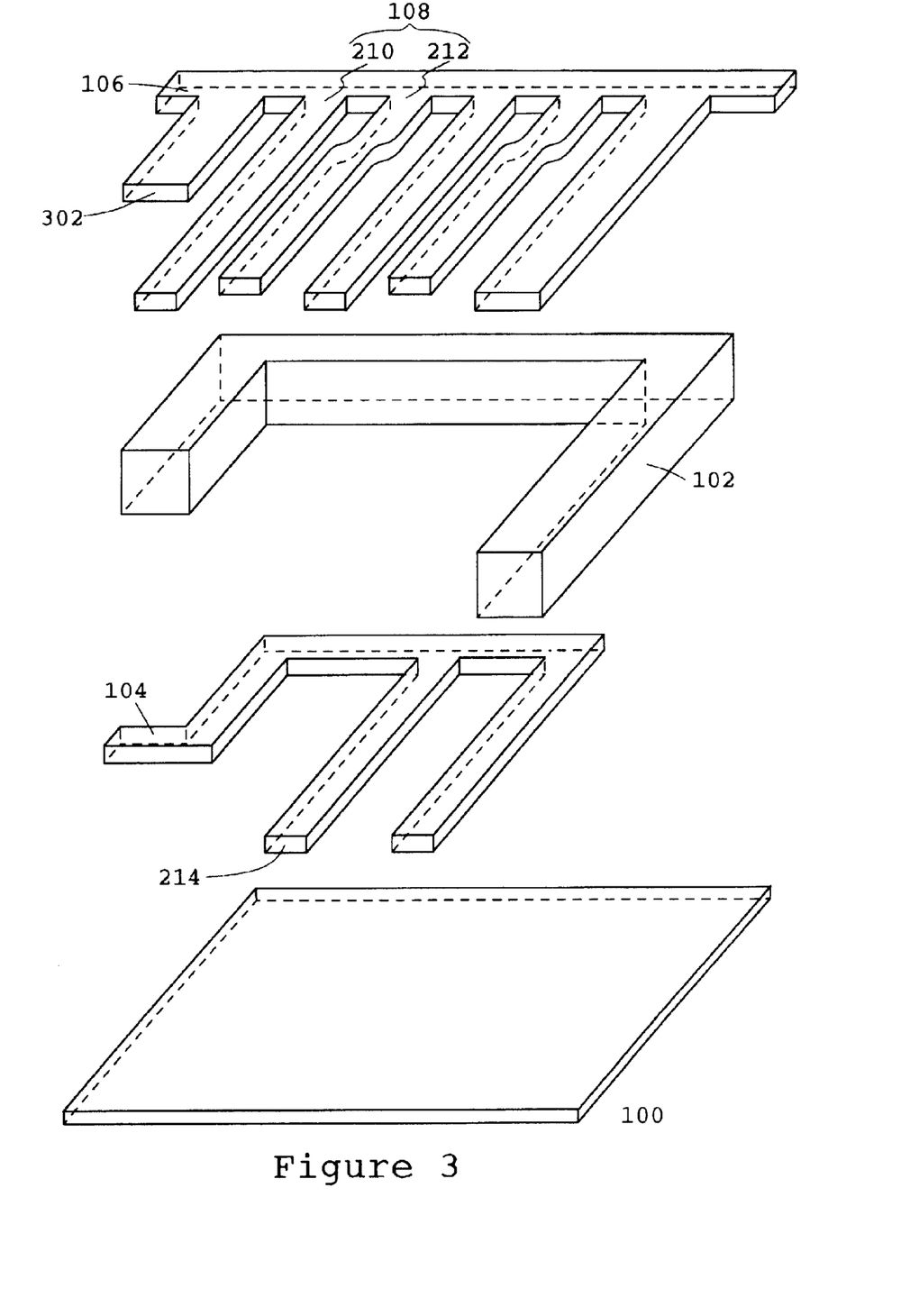
FIG. 3 is an exploded isometric, cutaway view of the reconfigurable compound diffraction grating in an initial position.

The reconfigurable, compound diffraction grating 1 is shown from a top view in FIG. 1, and from a cutaway isometric view in FIG. 3. A base 100, typically made of silicon, supports a frame 102. A lower electrode lead 104 lies on the base 100, and runs parallel to and below the frame 102, as shown in FIG. 3. An upper electrode lead 106, runs through two corners of the frame 102 along the top surface 302 of said frame 102, generally perpendicular to the extension of a set of diffraction beams 108 supported at their ends by the frame 102.

This set of beams 108 comprises both stationary beams 210 and deflectable beams 212. The planes of the beams 108, run substantially parallel to each other and substantially perpendicular to the sides of the frame 102, by which they are supported. The set of beams 108, are of substantially uniform thickness, width and length. The beams 108, are much longer than they are wide and thick. The beams 108, are spaced along the frame 102, at periodic intervals. Both the base 100, and the top surface of the set of beams 108, are of a reflective nature.

The upper electrode lead 106, the top surface 302 of the frame 102, and the set of beams 108 are all electrically connected, and together comprise an upper electrode. The lower electrode lead 104 and a series of lower electrode extension beams 214 are all electrically connected, and together comprise a lower electrode. The frame 102, which is an electrical insulator, enables the introduction of voltage differentials between the upper electrode comprising 106, 302 and 108, and the lower electrode comprising 104 and 214.

The deflectable beams 212, can be identified as those in the set of beams 108, which have the lower electrode extension beams 214, running underneath them. Also, in the initial undeflected position shown in FIG. 3, the deflectable beams 212, are in an elevated plane above the stationary beams 210, although remaining generally parallel. The relative parallelism is achieved by the excessive length of all of the beams 108 as compared to their length and width. This elevation of the deflectable beams 212, is a key feature in the design of the reconfigurable compound diffraction grating 1, which can be viewed as the superposition of two grating structures. The series of deflectable beams 212, comprise a low resolution grating secondary to the higher resolution primary grating consisting of the full set of beams 108.

The diffraction of incident light by the reconfigurable compound diffraction grating is controlled by manipulating the vertical position of particular individual beams in the set of beams 108, and in particular, by changing the vertical position of the deflectable beams 212 while leaving unaltered the vertical position of the stationary beams 210.

Figure 2:
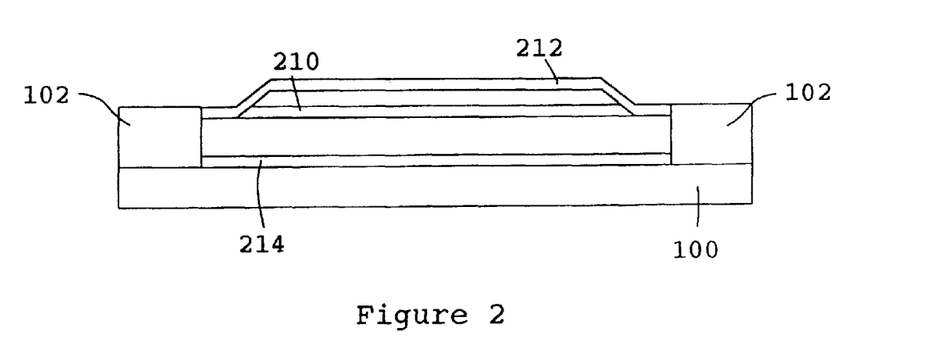
FIG. 2 is a two dimensional side view of a deflectable beam and a stationary beam in the initial position of the compound diffraction grating.

FIG. 2 shows a cutaway side view of the interior of the reconfigurable compound diffraction grating in which the vertical elevation of the plane of the deflectable beams 212, over the plane of the stationary beams 210 is evident. One of the lower electrode extension beams 214 is shown lying on the base 100, immediately beneath one of the deflectable beams 212. This deflectable beam 212 is shown in its initial position. As seen in FIG. 2, the majority of the top surface of the deflected deflectable beam 212, remains substantially parallel to an adjacent stationary beam 210. Application of a voltage differential applied between the deflectable beams 212, and the lower electrode extension 214, would result in a deflection of the beams 212, in which they would approach the plane of the stationary beams 210. Of course, application of different voltages would result in different degrees (distances) of deflection.

FIG. 3 is a cutaway isometric view of the reconfigurable compound diffraction grating in an initial, undeflected position. This view shows exactly how the lower electrode extension beams 214, project along the base 100 from the lower electrode lead 104, and how the deflectable beams 212 are positioned directly above the lower electrode extension beams 214 so that they may be deflected when a voltage differential is applied between the upper and lower electrodes generally.

Figure 4:
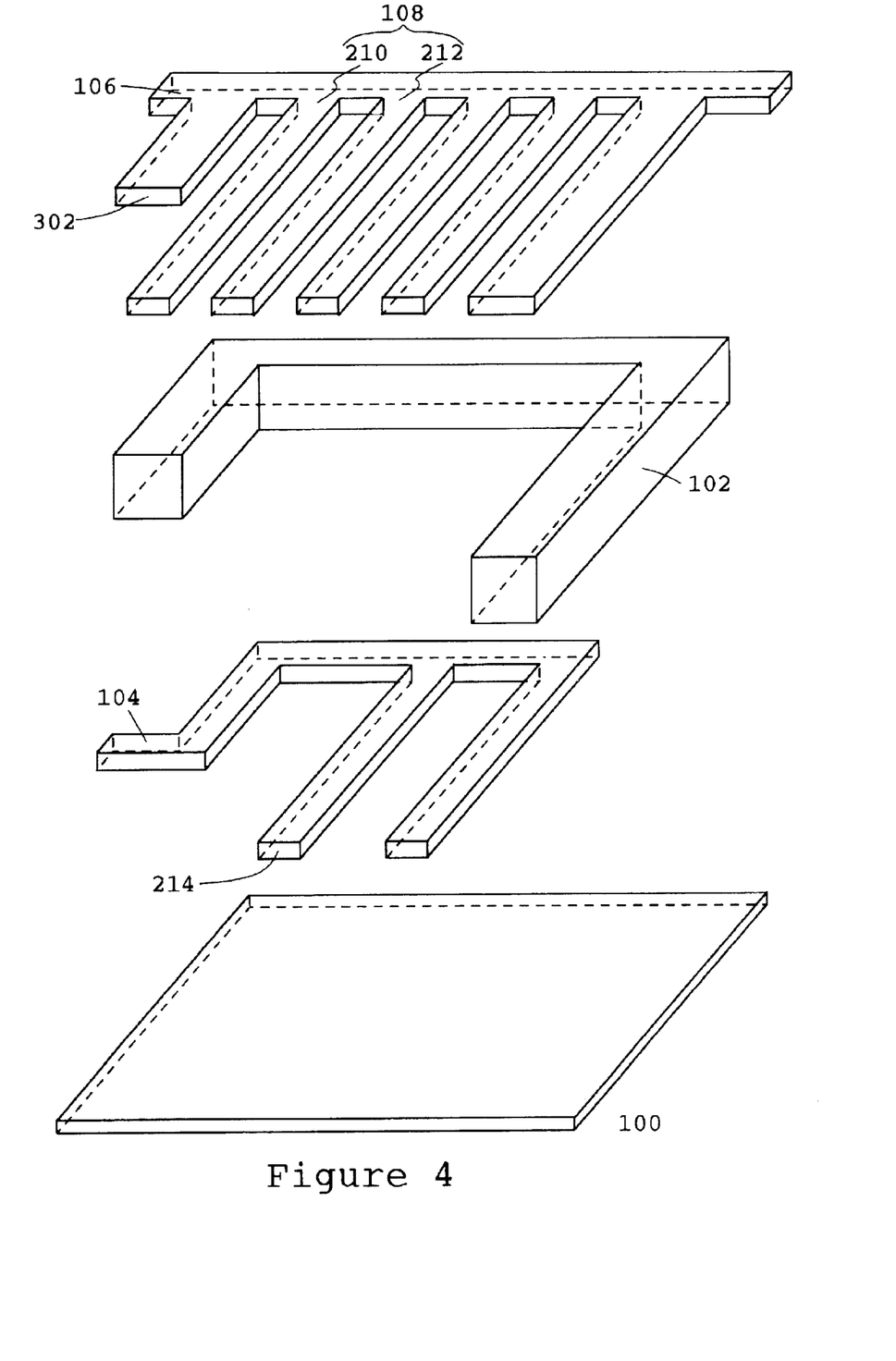
FIG. 4 is an exploded isometric, cutaway view of the reconfigurable compound diffraction grating in a secondary position.

FIG. 4 is a similar cutaway isometric view of the reconfigurable compound diffraction grating, with the deflectable beams 212 depicted at a deflected position in which the deflectable beams 212, are in the same plane as the stationary beams. Applying a voltage differential across the two (upper and lower) electrodes via the upper and lower electrode leads 106 and 104, respectively, causes the deflectable beams 212 to move towards the lower electrode extension beams 214. The deflection of the deflectable beam 212, is proportional to the voltage applied to the lower electrode lead 104, and therefore to the lower electrode extension beam 214 electrically connected thereto.

The upper electrodes (comprising 106, 302, and 108 (i.e., 210/212)) are typically fabricated as a unit whole with the rest of the grating structure typically of a material such as silicon. No shielding is necessary between the stationary beams, 210, and the adjacent deflectable beams, 212, since the aspect ratio of the set of beams, 108, is such that voltage applied to the lower electrode lead 104, and therefore to the lower electrode extension beam, 214, is enough to only deflect the deflectable beam, 212.

Figure 5:
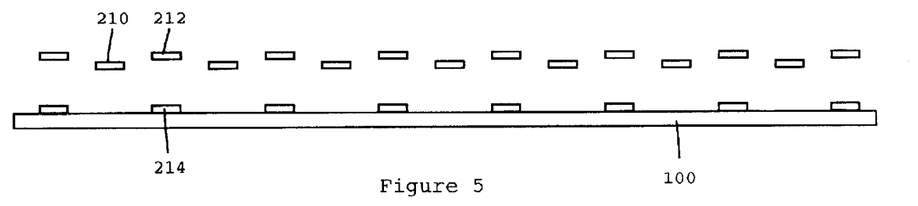
FIG. 5 is a schematic cross sectional view of the reconfigurable compound diffraction grating with every other beam being a deflectable beam with an associated lower electrode extension beam.

For descriptive purposes thus far, the stationary beams 210, and the deflectable beams 212 have been shown alternating every position in the diffraction grating, which is represented in the cross sectional schematic view of FIG. 5. Alternative configurations of the stationary beams 210, and the deflectable beams 212, may be desired depending on the specific application of the diffraction grating. Although the diffraction of the incoming light is altered by changing the vertical position of the deflectable beams 212, and thereby changing the vertical spacing between the stationary beams 210, and the deflectable beams 212, alternative configurations of the stationary beams 210, and the deflectable beams 212 are beneficial for various parts of the spectrum. In addition, such configurations can be determined based on the resolution requirements of the secondary grating structure that consists of the deflectable beams 212.

Figure 6:
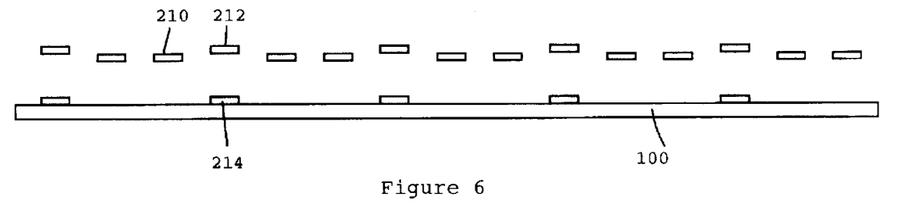
FIG. 6 is a schematic cross sectional view of the reconfigurable compound diffraction grating with every third beam being a deflectable beam with an associated lower electrode extension beam.
Figure 7:
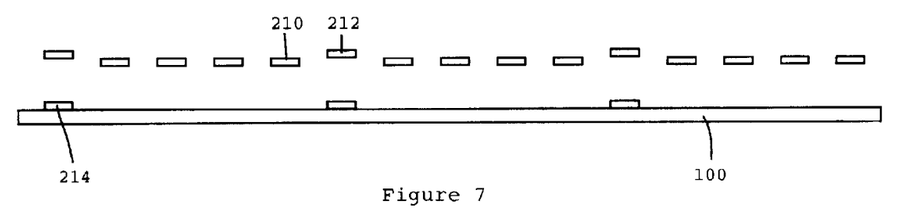
FIG. 7 is a schematic cross sectional view of the reconfigurable compound diffraction grating with every fifth beam being a deflectable beam with an associated lower electrode extension beam.

FIG. 6 presents an alternative configuration in which the deflectable beams 212 occupy every third position and the stationary beams 210 occupy the remaining positions. Similarly, FIG. 7 presents another alternative configuration in which the deflectable beams 212 occupy every fifth position and the stationary beams 210 occupy the remaining positions. The alternative configurations are not limited to those shown in FIGS. 5, 6, and 7, and indeed, any repetitive periodic pattern could be incorporated into the grating design and is contemplated by this disclosure and its subsequent associated claims. From these configurations, the diffraction of the incoming light is controlled by the vertical position of the deflectable beams 212.

Figure 8A:
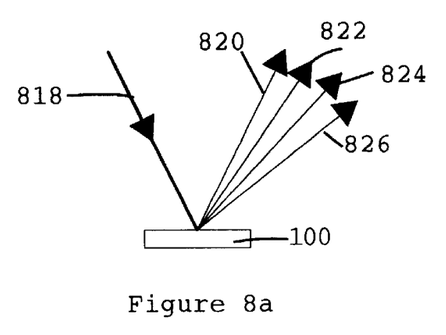
FIGS. 8a and 8b is a representation of light diffracting from the compound grating in the initial undeflected and secondary deflected positions.
Figure 8B:
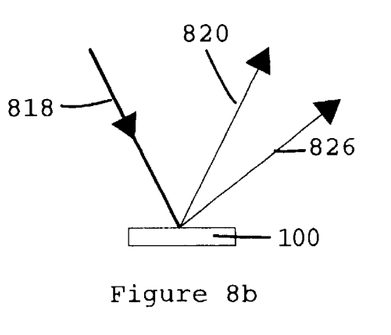

Using the configuration in which every third beam is deflectable, as presented in FIG. 6, FIGS. 8a and 8b are respective representations of the light diffracted from the reconfigurable diffraction grating 1 in the initial position (FIG. 8a) and as the beams are deflected to the secondary position where the deflected and stationary beams are aligned (FIG. 8b). That is, FIG. 8a represents the initial position of FIG. 3, and FIG. 8b represents the secondary position of FIG. 4, but with the every-third-beam spacing of FIG. 6. The diffraction is changed when the beams are deflected due to the change in the position of the reflective surface.

FIG. 8a shows the light diffracted from the reconfigurable compound diffraction grating base 100 in the initial position of the configuration of every third beam being deflectable. The secondary diffraction grating consisting of only the deflectable beams 212 causes the diffraction described below as due to 3d spacing. The primary diffraction grating consisting of the entire set of beams 108, accounts for the diffraction described below as due to d spacing. The diffraction generated from impinging light, 818, includes a zero order, 820, a first order (due to 3d spacing where d is beam spacing), 822, a second order (due to 3d spacing), 824 and a third order/first order superposition (due to 3d spacing and d spacing, respectively), 826. FIG. 8b shows the diffraction generated from the grating base 100 when the deflected beams (every third beam configuration) are moved to their secondary position where they are aligned with the undeflected beams. In this configuration only the zero order, 820, and first order (due to d spacing), 826 are present as a result of impinging light, 818. It is important to note that FIGS. 8a and 8b are simply illustrative of how light readings may be taken from this grating, and that many other variations obvious to someone of ordinary skill are possible and clearly within the scope of this disclosure and its associated claims.

The reconfigurable diffraction grating is typically fabricated using MEMS processing. Current MEMS processing techniques are capable of features on the scale of 1–2 microns. The most critical dimension in the operation of the diffraction grating is the width of the beam. The ruling or grating spacing determines the resolution of the grating. With the current feature sizes on the 1–2 micron scale, a grating comparable with a medium resolution (600–1200 grooves/mm) conventional optical grating is produced. This resolution is ideal for the visible and near-infrared region of the electromagnetic spectrum and higher wavelengths, as well. The design of the reconfigurable compound diffraction grating can be scaled to include wider beams and grating spacings to be useful in applications in the infrared region of the electromagnetic spectrum. As the size limitations of the MEMS processing technique decreases, the reconfigurable diffraction grating will be applicable below this wavelength, and it is contemplated that the scaling of the beam width and ruling to such smaller dimensions is fully encompassed by this disclosure and its subsequent associated claims.

The use of such a reconfigurable compound diffraction grating could be incorporated in a miniature spectrometer apparatus, and is part of this disclosure and its associated claims. In miniaturizing a spectrometer setup, size, space and simplicity are critical factors. A grating designed on the scale described above would greatly minimize the space required. Control of the grating would also become simplified and automated by the calibrated voltage sequence applied to change the grating spacing.

The use of such a reconfigurable compound diffraction grating could also find application in the development of a tunable laser cavity as well. Conventional gratings are used in laser cavities to tune the lasers to a specific wavelength, usually by manual rotation. Use of the reconfigurable compound diffraction grating in the tunable laser cavity would simplify control of the wavelength selection to the application of a precalibrated voltage setting and allow for rapid and automated sequencing between lasing lines. This too, is contemplated in the scope of this disclosure and its associated claims.

Presented above is just a single embodiment of the present invention. Alternative embodiments include variations in the configuration of beams that establish the rulings of the diffraction grating. The design presented above can be formed with a variety of beam widths and spacings between the beams, also known as grating spacing. For example, these variations include but are not limited to, beams spaced half a beam width apart, a quarter of a beam width apart, and twice a beam width apart. All such variations, and similar variations, are contemplated by this disclosure and its associated claims.

Another alternative embodiment of the reconfigurable compound diffraction grating includes coating the set of beams 108, the upper electrode lead 106, and the lower electrode lead 104, with a thin film of reflective coating such as gold or aluminum in order to significantly increase the reflectivity and therefore resultant signal strength. Coating the top surface of the set of beams 108, also provides a means of reducing the electrical resistance. This is particularly important in high frequency applications.

Figure 9:
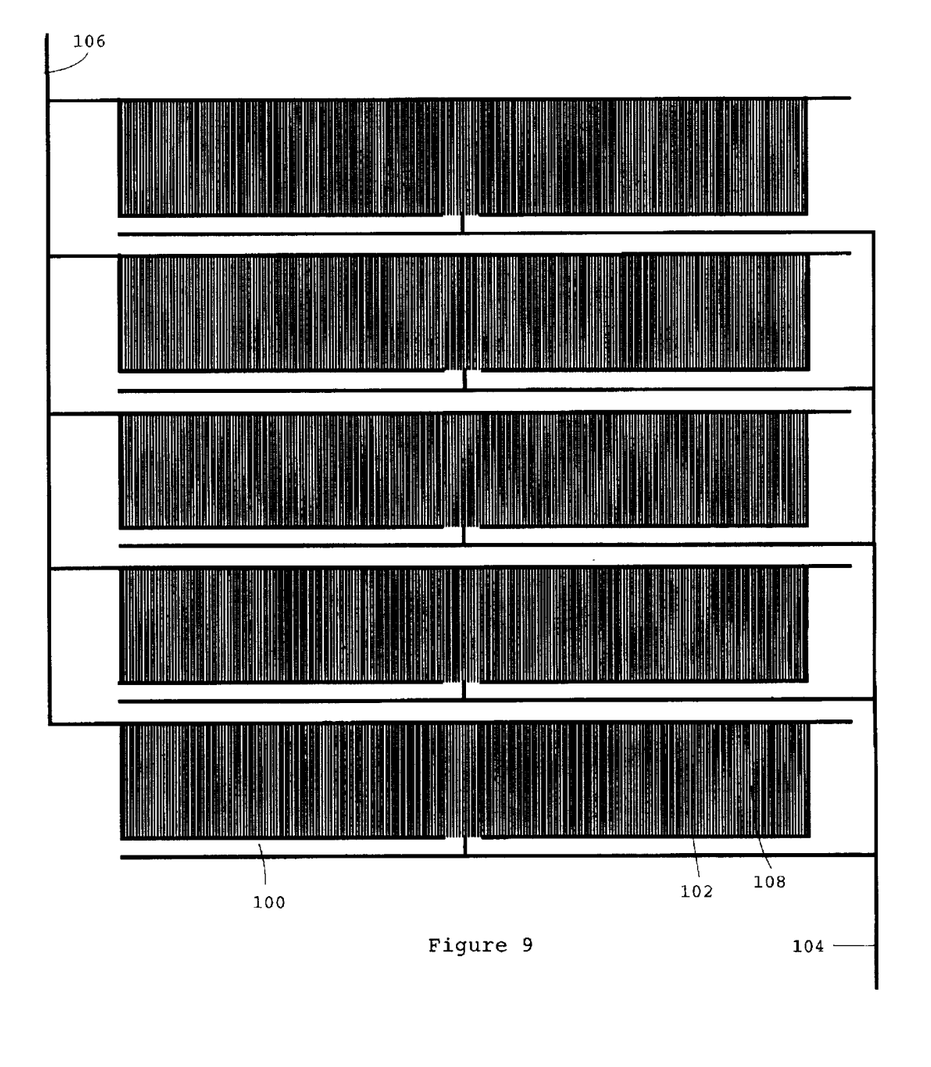
FIG. 9 is a top view of an example of an array of reconfigurable compound diffraction gratings.

Another alternative embodiment of the present invention includes expanding the single diffraction grating presented above to an array of diffraction gratings that would respond to a broader input signal or have a multitude of beam configurations as presented for example in FIGS. 5, 6, and 7 available in one array to a single input signal for parallel processing. One such embodiment is presented in FIG. 9. The design of the reconfigurable compound diffraction grating from FIG. 1 is extended in width and replicated in a 1×5 array of diffraction gratings connected by the common upper electrode lead 106, and a lower electrode lead 104, on a common base 100. The individual frames 102 and set of beams 108, are evident in each array grating element.

Yet another alternative embodiment of this invention is the reconfigurable compound diffraction grating configured with a lower electrode extension beam 214, under every beam in the set of beams 108, thereby making every beam a deflectable beam 212, wherein some of the beams 108 are voltage deflected to a position appropriate to stationary beams 210, while others are voltage deflected to a position appropriate to deflectable beams 212, as earlier described. With this design, the voltage applied to the lower electrode leads 104 can be controlled to individually address each lower electrode extension 214 to actively reconfigure the diffraction grating to the appropriate configuration (every other, every third, every fifth, etc.) for the application in which it is being used. This advanced design is a natural extension of the embodiments presented herein and allows a single reconfigurable compound diffraction grating to satisfy all possible configuration requirements.

While only certain preferred features of the invention have been illustrated and described, many modifications, changes and substitutions will occur to those skilled in the art. It is, therefore, to be understood that the subsequent associated claims are intended to cover all such modifications and changes as fall within the true spirit of the invention.

I claim:

1. An array of reconfigurable diffraction gratings comprising at least one diffraction grating, each said diffraction grating comprising:

a plurality of substantially parallel diffraction beams further comprising a plurality of stationary beams and a plurality of deflectable beams; in an initial position, said stationary beams substantially residing within a stationary beam plane and said deflectable beams substantially residing within a deflectable beam plane slightly elevated with respect to said stationary beam plane; and said deflectable beams occupying regular, periodic positions among said diffraction beams and separated from one another within each such period by at least one successive stationary beam;

a plurality of lower electrode extension beam means each associated with, substantially parallel to, and beneath, one of said deflectable beams; and voltage differential means applying a selected voltage differential between each of said lower electrode extension beam means and its associated deflectable beam thereby moving said deflectable beams and hence said deflectable beam plane by a selected distance, from said initial position.

2. The grating array of claim 1, each said diffraction grating of said grating array further comprising:

a plurality of second lower electrode extension beam means each associated with, substantially parallel to, and beneath, one of said stationary beams; and second voltage differential means applying a second selected voltage differential between each of said second lower electrode extension beam means and its associated stationary beam thereby moving said stationary beams and hence said stationary beam plane into said initial position and enabling selection of said initial position.

3. The grating array of claim 2, wherein for each said diffraction grating of said grating array:

the selected voltage differential applied between each lower electrode extension beam means and its associated deflectable beam, and the second selected voltage differential applied between each second lower electrode extension beam means and its associated stationary beam, is individually controllable; whereby the separation of said deflectable beams from one another within each said period by said at least one successive stationary beam may be actively, electronically reconfigured.

4. The grating array of claim 1, wherein said deflectable beams of at least one diffraction grating of said grating array are so-separated from one another by exactly one stationary beam.

5. The grating array of claim 1, wherein said deflectable beams of at least one diffraction grating of said grating array are so-separated from one another by exactly two stationary beams.

6. The grating array of claim 1, wherein said deflectable beams of at least one diffraction grating of said grating array are so-separated from one another by exactly four stationary beams.

7. The grating array of claim 1, said grating array comprising exactly one said diffraction grating.

8. The grating array of claim 1, said grating array comprising at least two of said diffraction gratings, wherein the periodic position separations of said deflectable beams of at least one of said diffraction gratings is different than the periodic position separations of said deflectable beams of at least another one of said diffraction gratings.

9. The grating array of claim 1, further comprising a reflective coating on at least an upper surface of said diffraction beams of at least one of said diffraction gratings and on at least an upper surface of a base of said at least one of said diffraction gratings.

10. The grating array of claim 1, wherein said grating is fabricated using microelectromechanical systems technology.

11. The grating array of claim 1 in combination with a spectrometer, wherein said grating is incorporated into said spectrometer and used for controlling grating spacing for said spectrometer.

12. The grating array of claim 1 in combination with a laser, wherein said grating is incorporated into said laser and used for tuning laser line sequencing of said laser.

13. The grating array of claim 1, wherein a ratio of spacing between each successive diffraction beam to a width of each said diffraction beam is substantially between ¼ to 1 and 2 to 1.

14. A method for reconfiguring an array of reconfigurable diffraction gratings comprising at least one diffraction grating, comprising the steps of, for each said diffraction grating of said grating array:

applying a selected voltage differential between a plurality of substantially parallel deflectable beams and a plurality of lower electrode extension beam means each associated with, substantially parallel to, and beneath, one of said deflectable beams; and moving thereby, said deflectable beams and hence a deflectable beam plane within which said deflectable beams reside, by a selected distance, from an initial position slightly elevated with respect to a plurality of stationary beams substantially residing within a stationary beam plane;

a plurality of substantially parallel diffraction beams comprising said plurality of deflectable beams and said plurality of stationary beams; and said deflectable beams occupying regular, periodic positions among said diffraction beams and being separated from one another within each such period by at least one successive stationary beam.

15. The method of claim 14, comprising the further steps of, for each said diffraction grating of said grating array:

applying a second selected voltage differential between each of said stationary beams and a plurality of second lower electrode extension beam means each associated with, substantially parallel to, and beneath, one of said stationary beams; and moving thereby, said stationary beams and hence said stationary beam plane into said initial position and enabling selection of said initial position.

16. The method of claim 15, comprising the further step of, for each said diffraction grating of said grating array:

individually controlling the selected voltage differential applied between each lower electrode extension beam means and its associated deflectable beam, and the second selected voltage differential applied between each second lower electrode extension beam means and its associated stationary beam; whereby the separation of said deflectable beams from one another within each said period by said at least one successive stationary beam may be actively, electronically reconfigured.

17. The method of claim 14, further comprising so-separating said deflectable beams of at least one grating of said grating array from one another by exactly one stationary beam.

18. The method of claim 14, further comprising so-separating said deflectable beams of at least one grating of said grating array from one another by exactly two stationary beams.

19. The method of claim 14, further comprising so-separating said deflectable beams of at least one grating of said grating array from one another by exactly four stationary beams.

20. The method of claim 14, said grating array comprising exactly one said diffraction grating.

21. The method of claim 14, said grating array comprising at least two of said diffraction gratings, the periodic position separations of said deflectable beams of at least one of said diffraction gratings being different than the periodic position separations of said deflectable beams of at least another one of said diffraction gratings.

22. The method of claim 14, further comprising providing a reflective coating on at least an upper surface of said diffraction beams of at least one grating of said grating array and on at least an upper surface of a base of said at least one grating of said grating array.

23. The method of claim 14, comprising the further step of fabricating said grating array using microelectromechanical systems technology.

24. The method of claim 14, comprising the further steps of incorporating said grating array into a spectrometer and using said grating array for controlling grating spacing for said spectrometer.

25. The method of claim 14, comprising the further steps of incorporating said grating array into a laser and using said grating array for tuning laser line sequencing of said laser.

26. The method of claim 14, comprising the further step of providing a ratio of spacing between each successive diffraction beam to a width of each said diffraction beam substantially between ¼ to 1 and 2 to 1.

* * * * *